Oct. 27, 1959     A. K. ANANDER     2,910,265
FLEXIBLE SHEET SUPPORT FOR LARGE CAMERAS
Filed Nov. 3, 1954     2 Sheets-Sheet 1

INVENTOR
Andrew K. Anander
BY Morgan, Finnegan, Durham & Pine
ATTORNEYS

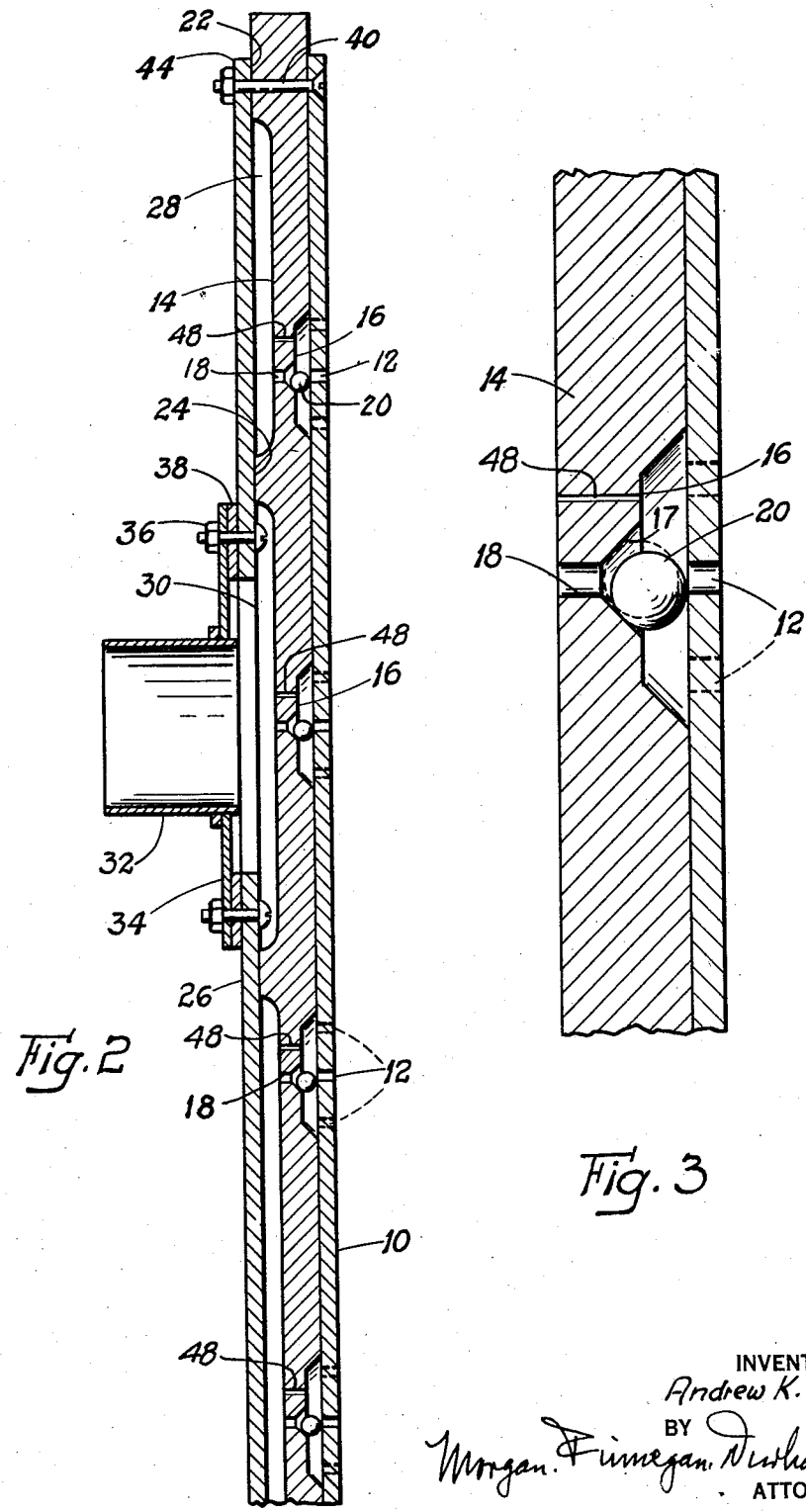

United States Patent Office 2,910,265
Patented Oct. 27, 1959

2,910,265

FLEXIBLE SHEET SUPPORT FOR LARGE CAMERAS

Andrew K. Anander, Glen Cove, N.Y., assignor to Powers Chemco, Inc., Glen Cove, N.Y., a corporation of New York Application November 3, 1954, Serial No. 466,509

2 Claims. (Cl. 248—363)

This invention relates to a support for a photosensitive sheet of paper in a photographic camera and has specific relation to an improved support forming part of a photographic camera wherein a sheet of photosensitive paper is held in firm and intimate contact with the support by means of suction.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a vertical section to enlarged scale taken along line 2—2 of Figure 1 and showing further details of the construction of the support and the valve organization therewithin; and Figure 3 is an enlarged detailed sectional view of one of the valves forming a part of the present invention.

Figure 1:
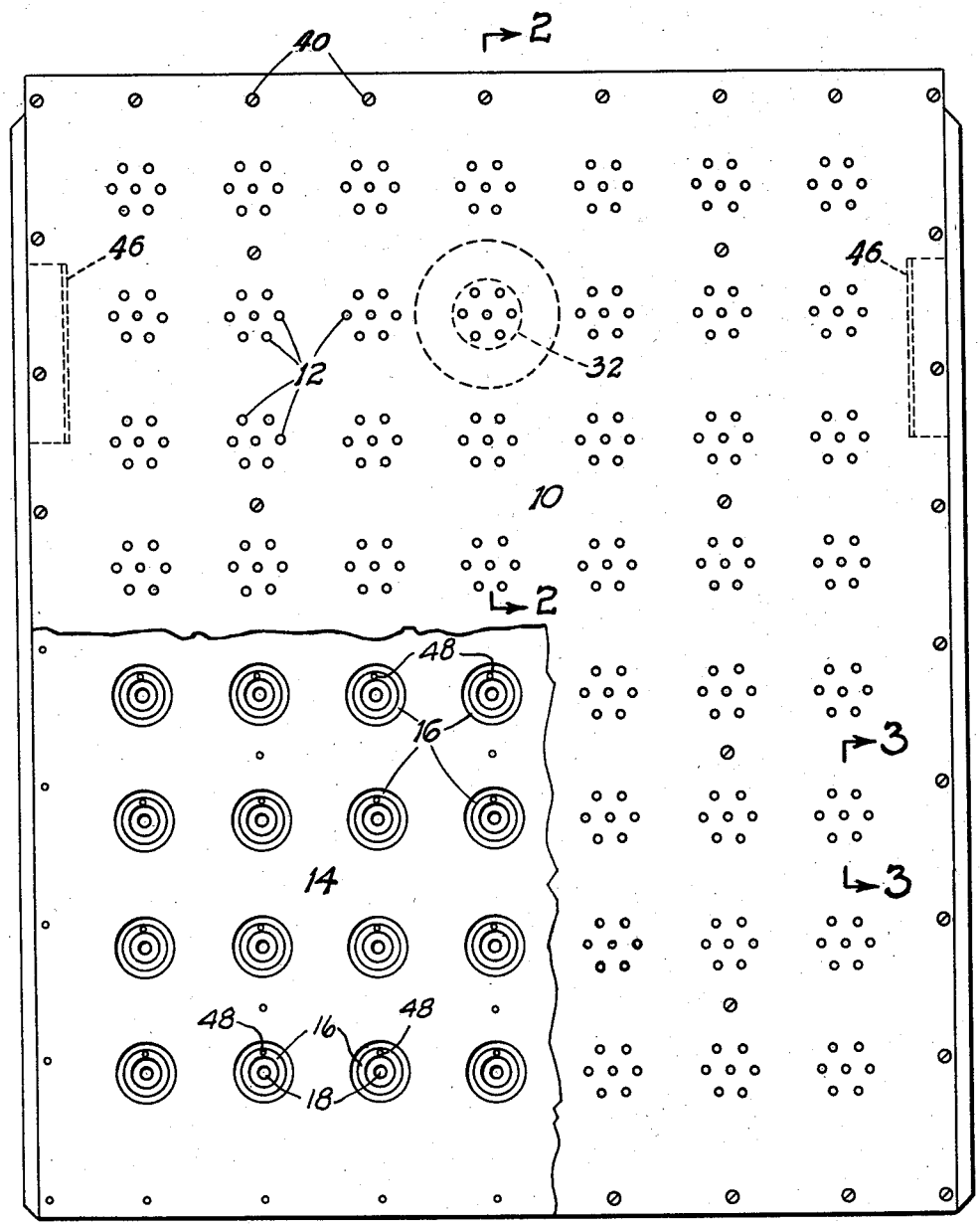
Figure 1 is a plan view of the improved support of this invention with a portion of the facing plate being broken away to show details of the valve construction.

The present invention has for its object the provision of an improved support for the flexible sheet of photosensitive paper in a photographic camera wherein the paper is held in contact with the support by means of suction. A further object is an improved support of this type which may be indiscriminately used to support sheets of material of different size without resulting in a waste of suction and which maintains the suction requirement at a minimum. A still further object is the provision of an improved suction type of support for a sheet of photosensitive material in a photographic camera which is automatic in its operation of maintaining the suction requirement at a minimum by automatically reducing or preventing loss of suction at those portions of the support not covered by the sheet of material and yet which is extremely simple, economical to manufacture and highly reliable in operation.

In accordance with the present invention the support is laminated, being made up of three plate members the facing plate of which is provided with groups of openings distributed over its area and through which suction is applied to the flexible sheet of photosensitive material to hold it flat and firm against the surface or face of the facing plate. The surface of the support against which the sheet of material is held is flat and substantially vertical and the material with which the support is used and which is held against this face may be any of the photosensitive sheets customarily employed in photography such as photographic film, photographic paper, strip film, camera copy and the like. Each of the groups of openings in the facing plate communicates with a source of suction such as a suction pump through individual passageways which lead from the groups of openings to a common manifold. These passageways are provided in a backing plate which overlies and is secured to the back of the facing plate. Within each of these passageways is positioned a flow operated valve operative to control communication of the source of suction with each of the groups of openings through the associated passageway. The valve is gravity biased to its open position and is moved to its closed position by air flow resulting from the application of suction through the passage to the openings when they are unrestricted. Thus the valves associated with each of the groups of openings which are not completely covered by the sheet of photosensitive material which is being supported on the face of the support at any particular time will be automatically closed thereby preventing direct communication of the source to atmosphere through the associated passageway and permitting the use of a source of suction of minimum capacity. In bypass relation with each of the valves is a small bleed which always permits a very restricted communication of each group of openings with the source of suction thereby providing for the application of suction to a group of openings when the valve associated therewith has been inadvertently initially closed due to some irregularity such as the paper not being properly positioned against the facing plate when the suction was initially applied.

As embodied, the valve means provided in each of the passageways comprises an elongated, conical walled section formed in the passageway with the axis of this section being generally normal to the face of the support and therefore horizontal when the support is in its vertical or upright operating position. This conical wall section converges in the direction of air flow created by the application of suction to the openings through the passage. Retained in this section is a ball valving member that moves along the lower inclined surface of the section to and from a non-valving or open position and a position in valving engagement with the wall of the conical section. The ball valving member is normally biased by gravity to its open position and is moved up the inclined lower surface of the conical section to its closed position by the air flow resulting from suction being applied to the openings through the passage when the openings are unrestricted. When in this closed position it is effective to prevent the flow of air through the passageway thereby rendering it unnecessary for the suction means to do the useless work that would be required if the passage were left unrestricted when the openings in a particular group are not covered by the sheet of material applied to the support.

It will be understood that the foregoing general description and the following detailed description as well are exemplary and explanatory of the invention but are not restrictive thereof.

Referring now in detail to the drawings wherein there is depicted the preferred embodiment of the improved support of the present invention and wherein like reference characters designate like elements, the support shown therein comprises a facing plate 10 having a smooth flat outer surface and being provided with groups of openings 12 distributed uniformly throughout the area of the plate. The flat outer surface of plate 10 is adapted to have the sheet of photosensitive material placed over and in engagement therewith with the paper being held in firm contact with the face of the plate by the application of suction through the groups of openings 12. Overlying the back of plate 10 and in engagement therewith is the backing plate 14 which is cemented to plate 10 about the overlying edge of the two plates in a fluid tight manner. The face of plate 14 that is in engagement with facing plate 10 is provided with relieved portions or recesses 16 each of which communicates directly with and encompasses one of the groups of openings 12 provided in facing plate 10. Extending from the bottom of each of these relieved portions and through the backing plate 14 is the bore 18 the inner end of which is chamfered to provide an elongated conical surface 17 converging in the direction away from the relieved portion 16.

Positioned in this chamfered or conical walled portion 17 is the ball valving member 20 which normally occupies its non-valving or open position as shown in Figure 3 in solid lines and into which position it is biased by gravity. The valving member 20 is at all times in engagement with this conical surface, normally resting on the lower portion thereof, and to accomplish this purpose relieved portion 16 is of such a depth relative to the diameter of the ball as to prevent the ball from moving axially of the surface of portion 17 a sufficient distance to move out of contact with this surface. In response to air flow through passage 18 created as a result of suction being applied through this passage when openings 12 are not covered by a sheet of material the ball valving member 20 will roll up the inclined lower surface of the conical walled section and into valving engagement therewith as shown in the dotted line position in Figure 3 thereby restricting further air flow through the passage.

In order that suction may be conveniently applied to and through the passages 18 a suitable manifold is provided and for this purpose backing plate 14 is provided with an upstanding rim portion 22 extending about its outer edge and numerous upstanding bosses or spacing ribs 24. Positioned over the back of plate 14 and in fluid tight engagement with the upstanding rim 22 is cover plate 26 which is spaced from the major portion of the backing plate by means of this upstanding rim and the bosses or spacing ribs 24 thereby forming the chamber 28 between the inner surface of cover plate 26 and the outer surface of backing member 14 and which is in direct communication with the suction opening 30 formed in cover plate 26 and each of the passages 18 provided in the backing plate 14. Communication between chamber 28 and a suitable source of suction such as a pump, not shown, is had through the opening 30 and for this purpose a connector 32 provided with a radially extending flange 34 is secured about the opening 30 to the cover plate 26 in a fluid tight manner by the bolts 36 and the interposed gasket 38.

While the flow operated valve 20 controls communication of the source of suction with each of the groups of openings 12 through the bore or passage 18 each group of openings is always in very restricted communication with the source of suction through bleed 48 which extends through backing plate 14 from recess 16 to manifold chamber 28. By continuously applying suction to the recesses 16 through these bleeds inadvertent closing of any of the valves which have their associated openings 12 covered by a sheet of photosensitive paper will be automatically compensated for or corrected since the recess 16 will be gradually evacuated through bleed 48 thereby applying suction to the paper through the particular group of openings and equalizing the pressure on both sides of valve 20 causing the valve to move under the influence of gravity to its open position. This inadvertent closing of the valve or valves may occur for a number of reasons such as shifting the sheet on the support after the suction has been applied or having wrinkles or the like in the sheet when it is initially applied to the support so that when the suction is applied an initial air flow will be established through certain of the openings 12 that are covered by the sheet that is of sufficient magnitude to cause the valve to move to its closed position. Since it is essential that the sheet of paper be held flat against the support and in intimate contact therewith throughout its overlying area the bleeds 48 are highly desirable for satisfactory operation of the support and although these bleeds are of sufficient size to gradually evacuate a recess 16 which has its associated openings 12 covered by a sheet of paper and with which the associated valve 20 is closed it is sufficiently small so that the suction loss resulting therefrom in connection with the openings that are not covered is of no appreciable consequence. While the bleed has been disclosed as a separate bore other forms of bleeds such as flutes or irregularities in the valve or the valve seat may obviously be equally well employed.

The three overlying plates 10, 14 and 26 are secured together about their outer edges in a fluid tight manner by the bolts 40 which are countersunk into facing plate 10 and extend through aligned bores provided in the facing plate, backing plate 14 and cover plate 26. Threaded on the outer end of each of the bolts is a nut 44 which when tightened down securely clamps the plates together. These plates are preferably made of a plastic material such as phenol formaldehyde, or plate 10 may be of such a material, and a sealing cement is interposed between the plates about their outer edge prior to clamping the plates together by means of the bolts 40 and nuts 44, thereby insuring against possible air leakage.

The backing plate is secured to the photographic camera in any desired manner and in the illustrative organization angled members 46 are secured to and extend from cover plate 26 to facilitate this mounting operation.

In operation, the support is mounted within the camera in a vertical position, i.e., with the outer face of facing plate 10 vertically disposed, and a flexible sheet of photosensitive material of any size up to the actual size of the film support is placed over this outer facing. Suction is then applied through connector 32, opening 30 and chamber 28 to each of the passages 18 and their associated relieved portion 16 which in turn transmits the suction to the groups of openings 12. In the case of each of the groups of openings over which the sheet of photosensitive material lies the ball valving member 20 remains in its open or non-valving position as disclosed in Figure 3 and the suction applied through the openings 12 is effective to draw the sheet of material into firm and intimate contact with the flat surface of facing plate 10 thereby permitting accurate focusing upon this sheet of material. In the case of those groups of openings not completely covered by the sheet of material, however, air is drawn inward through these openings and through relieved portion 16 and passages 18 into chamber 28. This flow of air about the ball valving member 20 causes this member to roll up the lower inclined surface of the conical portion 17 of passage 18 into its closed or valving position with this conical portion, thereby preventing further flow of air through passage 18 and accordingly relieving the suction means of the necessity of continually drawing large quantities of air through the openings 12 that are not covered by the sheet of material. If any of the valves over the associated openings of which the paper is positioned are moved to the closed position suction will be applied to these openings through bleed 48 with the suction gradually increasing until the pressure differential across valve 20 is so small that the valve moves to the open position whereupon the full suction will be applied to the openings. When the sheet of material is ready to be removed the suction is relieved and the sheet removed from the flat surface of facing plate 10 after which the support is ready to receive another sheet of flexible photosensitive material.

With the organization of the present invention an automatic, simple, yet highly satisfactory support for use with photographic cameras is provided which is extremely economical to manufacture. In fabricating the many valve assemblies required it is merely necessary to bore through backing plate 14 to provide the bore 18, counterbore this bore to a predetermined depth to provide the relieved portion 16 and then countersink the juncture of the bore and the relieved portion by means of a conical countersink thereby providing the conical surface 17 upon which ball 20 rests. The required machining operations therefore are extremely simple reducing the overall cost of the apparatus to a minimum.

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a photographic camera the combination of a generally vertical support for a sheet of photosensitive paper, said support having a generally vertical backing member and a parallel facing member against which the sheet is held and which facing member has groups of openings distributed over its area, individual passageways communicating with each group of openings and through which suction is applied to said openings to retain said sheet in contact with said facing member, valve means within each of said passageways biased by gravity to the open position and moved to the closed position by air flow through the passage resulting from the application of suction through the passage to said openings when they are unrestricted, said valve means including a relieved portion individually communicating with each of said groups of openings, a valve seat formed in each of said passageways and a ball valving member retained on an inclined surface sloping downward from said seat in the upstream direction relative to the flow created by the suction, small bleed holes extending through said backing member, one extending into each of the relieved portions, for equalizing pressure on both sides of certain of the balls whenever openings in the facing member are covered with a sheet of material, said ball valving member moving along said inclined surface into and out of valving engagement with said seat, and said group of openings and said inclined surface cooperating with said ball to cause the air flow to force said ball valving member upwardly.

2. In a photographic camera the combination of a generally vertical support for a sheet of photosensitive paper, said support having a generally vertical backing member and a parallel facing member against which the sheet is held and which facing member has groups of openings distributed over its area, individual passageways communicating with each group of openings and through which suction is applied to said openings to retain said sheet in contact with said facing member, valve means within each of said passageways biased by gravity to the open position and moved to the closed position by air flow through the passage resulting from the application of suction through the passage to said openings when they are unrestricted, said valve means including a relieved portion individually communicating with each of said groups of openings, a valve seat formed in each of said passageways and a ball valving member retained on an inclined surface sloping downward from said seat in the upstream direction relative to the flow created by the suction, small bleed holes extending through said backing member, one extending into each of the relieved portions, for equalizing pressure on both sides of certain of the balls whenever openings in the facing member are covered with a sheet of material, said ball valving member moving along said inclined surface into and out of valving engagement with said seat, and at least one of said openings of each of said groups being spaced below its respective ball valving member to direct incoming air against said valve to rapidly close same.

References Cited in the file of this patent

UNITED STATES PATENTS

| | | |
|---|---|---|
| 1,734,028 | Brice | Nov. 5, 1929 |
| 1,781,366 | Campula | Nov. 11, 1930 |
| 2,214,290 | Ward | Sept. 10, 1940 |
| 2,317,348 | Wekeman | Apr. 27, 1943 |
| 2,425,921 | Crockett | Aug. 19, 1947 |
| 2,638,308 | Kell | May 12, 1953 |
| 2,694,337 | Anander | Nov. 16, 1954 |